United States Patent
Specht

(10) Patent No.: US 6,390,403 B2
(45) Date of Patent: May 21, 2002

(54) SEAT BELT RETRACTOR

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/784,607

(22) Filed: Feb. 15, 2001

(30) Foreign Application Priority Data

Apr. 25, 2000 (DE) .......................................... 100 20 245

(51) Int. Cl.[7] .......................... B60R 22/46; B60R 22/44
(52) U.S. Cl. .................. 242/374; 242/375.1; 242/390.8
(58) Field of Search .............................. 242/374, 375.1, 242/390.8, 390.9; 280/806, 807

(56) References Cited

U.S. PATENT DOCUMENTS

| | | | |
|---|---|---|---|
| 4,002,219 A | 1/1977 | Steinmann | 180/82 C |
| 5,201,385 A | 4/1993 | Browne et al. | 180/268 |
| 5,611,497 A * | 3/1997 | Krambeck et al. | 242/375.1 |

FOREIGN PATENT DOCUMENTS

| | | |
|---|---|---|
| DE | 3632066 | 8/1987 |
| DE | 3636073 | 4/1988 |
| DE | 4018214 | 12/1991 |
| DE | 4416200 | 7/1995 |
| DE | 19636448 | 2/1997 |
| DE | 19647841 | 5/1998 |
| DE | 4322798 | 2/1999 |
| DE | 19731689 | 2/1999 |
| EP | 0893313 | 7/1998 |

* cited by examiner

Primary Examiner—John M. Jillions
(74) Attorney, Agent, or Firm—Lonnie Drayer

(57) ABSTRACT

A seat belt retractor has a belt reel that is rotatably mounted on a frame and on which a seat belt can be wound and unwound. A motive spring biases the belt reel in the winding direction. An electric motor adjusts the spring force of the motive spring can be adjusted and/or a torque produced for tightening the seat belt. The torque can be transmitted to the belt reel by a clutch. The deformation of a deformable spring element brings the clutch into an engaged state. The spring element is held on one end of the spring by a holding device actuated by inertial force, at least for initiating its deformation.

16 Claims, 4 Drawing Sheets

SEAT BELT RETRACTOR

FIELD OF THE INVENTION

The present invention relates to a seat belt retractor.

DISCUSSION OF THE PRIOR ART

German patent application 100 13 870.5 teaches a seat belt retractor having a belt reel that is rotatably mounted on a frame and on which the seat belt can be wound and unwound. A motive spring biases the belt reel in the winding direction. An electric motor adjusts the spring force of the motive spring and/or a torque can be produced for tightening the seat belt. A clutch transmits torque to the belt reel. The clutch comprises a spring element that can be deformed by the torque and which, when deformed, brings the clutch into an engaged state.

SUMMARY OF THE INVENTION

The present invention provides a seat belt retractor having a clutch. A spring element, whose deformation brings the clutch into an engaged state, is held at one end of the spring by a holding device actuated by inertial force, in order to initiate its deformation, while the torque produced by a drive device acts upon the other end of the spring element. The deformation of the spring element is thus achieved by mere mechanical means to bring the clutch into the engaged state.

DETAILED DESCRIPTION OF THE INVENTION

Figure 1:
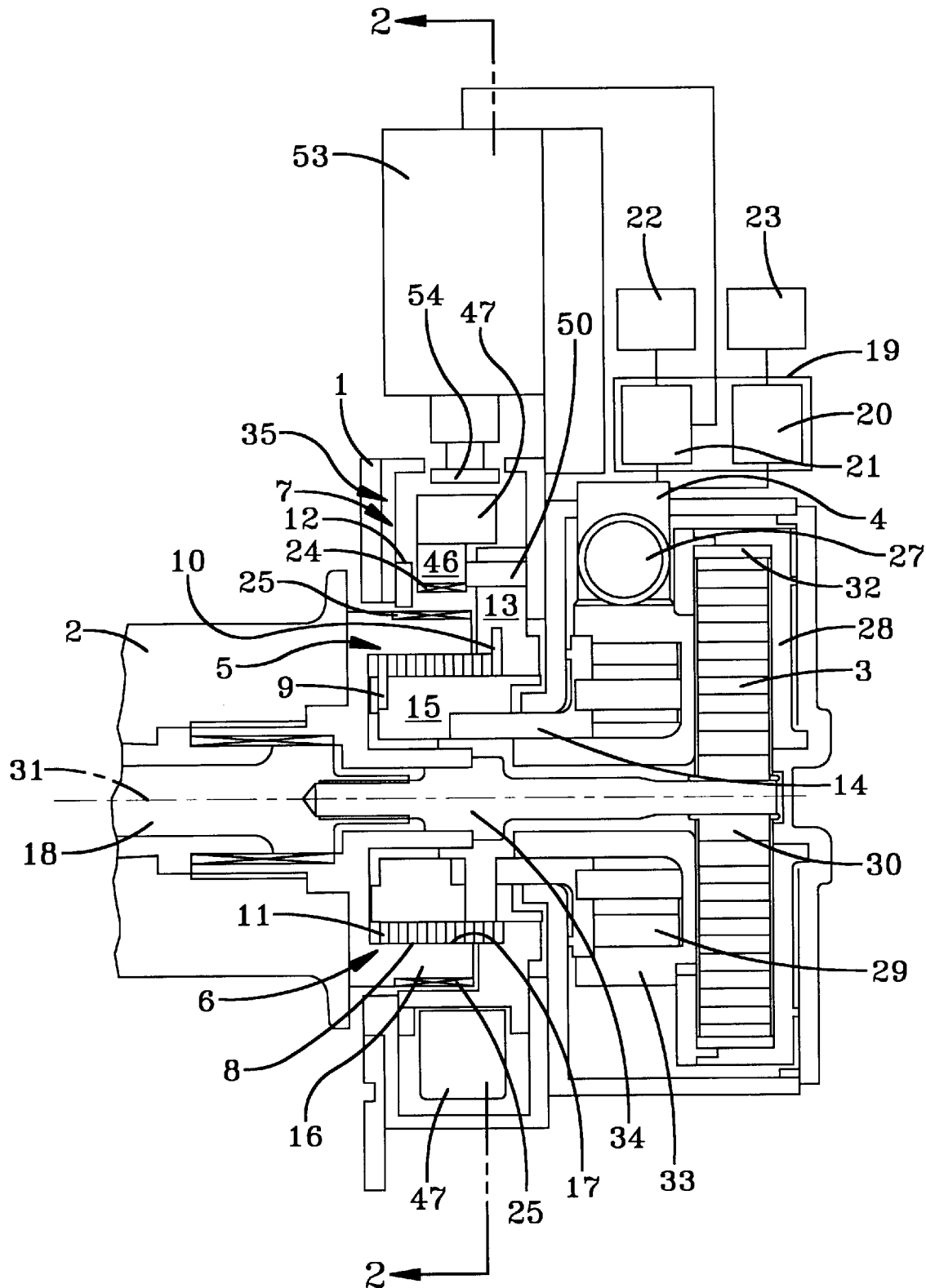
FIG. 1 is a fragmentary section through the spring side of a seat belt retractor according to a first embodiment of the invention.
Figure 2:
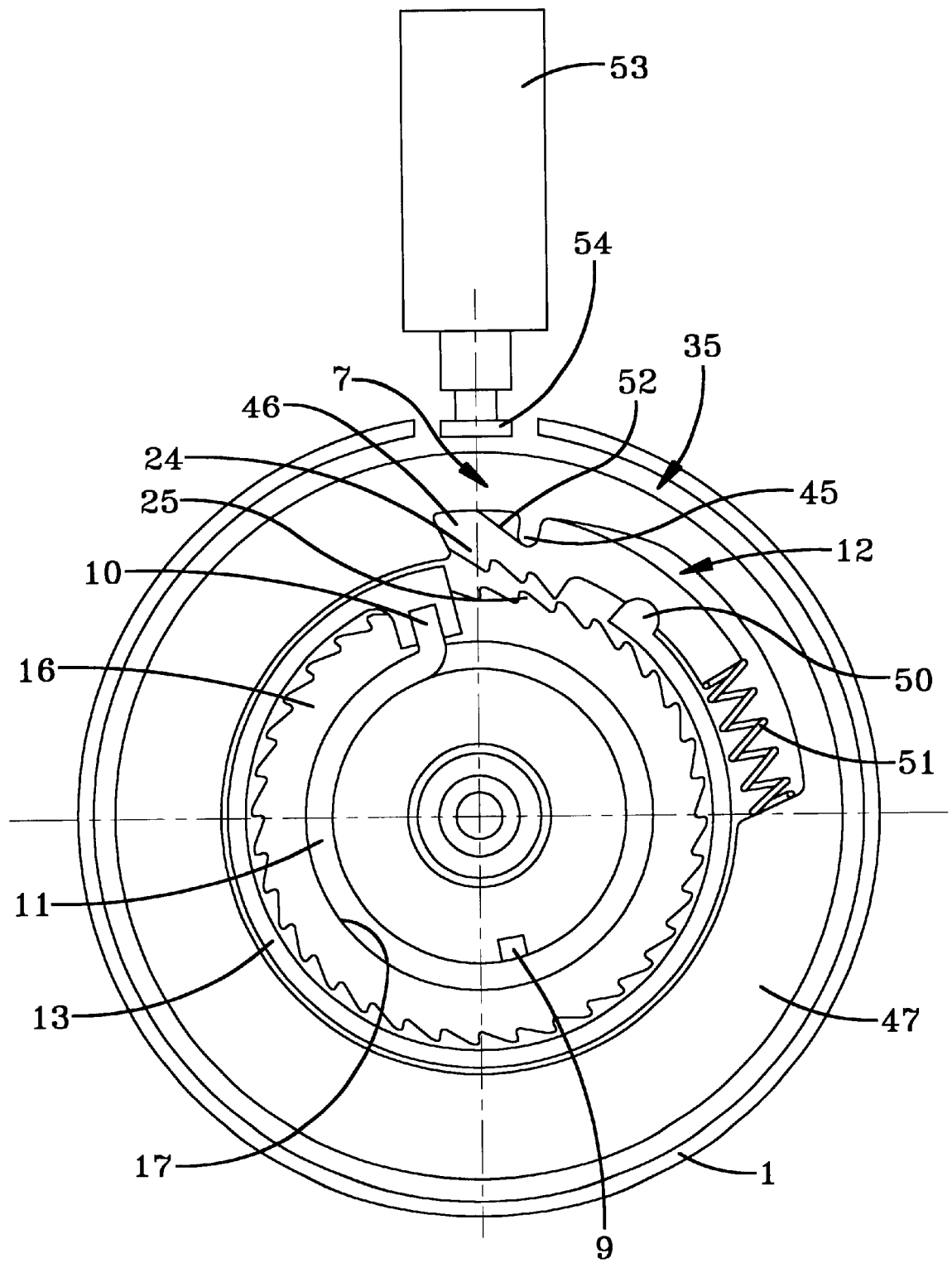
FIG. 2 is a sectional view of the embodiment in FIG. 1 along section line 2—2.

The figures show the spring side of a seat belt retractor according to the invention in section. With reference to FIGS. 1 and 2, a seat belt retractor according to the present invention has a belt reel 2 that is rotatably mounted on a frame 1. The belt reel is used for winding and unwinding a seat belt (not shown). The belt reel is biased in a winding direction by a motive spring 3. The motive spring has, in its interior, a spring core 30 via which the restoring force of the motive spring is transmitted to the belt reel. The motive spring is fastened to a spring cartridge 28 at an external fixing point 32. An electric motor 4 is provided for adjusting the spring force. The output shaft of the electric motor acts via a worm 27 on a worm wheel 33 that is non-rotatably connected to the spring cartridge 28.

When the seat belt is applied around a vehicle occupant the locking of the belt buckle is detected by a belt buckle sensor 23. Seat belt tension is controlled via a comfort control device 20 of the electric motor 4 in such a way that the retracting force of the motive spring 3 is reduced. In this way the comfort perceived by the wearer of the seat belt is improved. The rotational speed with this comfort adjustment is relatively low. When the seat belt is taken off, the releasing of the belt buckle is determined by the belt buckle sensor 23 and controlled via the comfort control device 20 of the electric motor 4 in such a way that the retracting force of the motive spring 3 is increased. The seat belt is thus wound on the belt reel with increased retracting force into its fully retracted position on the belt reel 2.

In the embodiment shown, the torque produced by the electric motor 4 is used not only for adjusting the spring force of the motive spring 3, but also for tightening the seat belt. For this purpose there is provided, between the output shaft or the worm wheel 27 and the belt reel 2, a clutch 5 that is disengaged during normal vehicle travel. In the disengaged state of the clutch 5, the restoring force of the motive spring 3 acts on the belt reel 2, as described in detail above.

If one or more sensors of the vehicle sensor system 22 detect a critical situation signifying a high probability of a crash, the electric motor 4 is activated by a tightening control device 21 connected to the sensor system 22. The tightening control device, together with the comfort control device can be a component of a central control device 19. The actuating device 35 is equipped with mechanical means in the embodiment shown and is activated by the torque supplied by the electric motor. When the mechanical actuating device is activated and the electric motor is switched on, the clutch 5 is engaged so that the torque supplied by the electric motor is transmitted directly to the belt reel.

In the embodiment shown the clutch 5 has a deformable spring element 6 which, when deformed, brings the clutch into an engaged state. The deformation of the spring element occurs due to the torque supplied by the electric motor 4. This torque is optionally transmitted via a damping device 29 to a coupling member 14 mounted rotatably around an axial projection 34 of the belt reel 2 that is coaxial with the belt reel axis 31. The restoring moment of the motive spring 3 can be transmitted to the belt reel via the axial belt reel projection 34. The coupling member 14 is rigidly connected to one end of the spring element 6. This spring end is designed as a spring arm 9 in the embodiment shown. The spring element 6 is designed, in the embodiment shown, as a wrap spring 11, in particular a helical wrap spring. The wrap spring comprises a spring wire having a rectangular cross-section and coiled with a cylindrical spring region 8 around a cylindrical part 15 of the coupling member 14. The cylindrical part acts as spring mandrel of the wrap spring 11.

The other spring end in the form of a spring arm 10 is rigidly connected to a bearing 13 rotatably mounted on the cylindrical part 15 of the coupling member 14. The bearing 13 is annular in the embodiment shown.

The cylindrical spring region 8 of the wrap spring 10 is located in an annular gap formed between the cylindrical part 15 of the coupling member 14 and a hollow cylinder 16 connected non-rotatably to the belt reel 2. The hollow cylinder 16 has teeth 25 on its outer circumference.

In the region of the hollow cylinder 16 and the annular bearing 13 there is a holding device 12 that co-operates with an adjusting device 7. The end of the spring to be fastened of the spring element can be rigidly connected to this bearing. The actuating device 35 working, as will be described below, due to inertial forces, is used for activating the adjusting device producing an adjusting movement substantially radially with respect to the belt reel axis 31. The adjusting movement is effected by an inertial mass 47, as will be described in detail hereinafter. During normal operation of the seat belt retractor, the holding device 12 is freely movable, in particular rotatably mounted with the adjusting device 7. The holding device can be pivotally mounted on the annular bearing 13 which is mounted in a freely rotatable manner with respect to the belt reel 2 during normal operation.

To effect the holding function of the holding device 12 at one end of the spring, the holding device can be connected to the belt reel 2 by an interlocking fit. When torque is introduced into the spring element, the belt reel remains stationary due to its inertia, as a result of which the end of the spring to be fastened is fixed and the spring element, preferably designed as a wrap spring 11, is deformed by the torque which has been introduced. The clutch 5 is engaged by this deformation.

The interlocking fit of the holding device 12 with the belt reel 2 can preferably be produced with a pawl 46 that engages teeth 25 connected to the belt reel. The pawl is preferably pivotally mounted in a pivot bearing 50 on the bearing 13 against the force of a return spring 51 (see FIG. 3). The return spring can be supported on the inertial mass 47. In a preferred manner, in normal operation of the seat belt retractor, the inertial mass is freely movable, in particular freely rotatable with respect to the belt reel and can, for this purpose, be a ring. If necessary, the inertial force transmitted by the inertial mass 47 can also be supported by an electromagnetically actuated auxiliary holding device. This auxiliary holding device can be used for fastening the inertial mass during the guiding of the holding device into the fastening position.

If a torque is transmitted via the coupling member 14 by the electric motor 4 due to the control signal of the tightening control device 21, this torque acts on the spring arm 9. The other spring arm 10 is secured by the holding device after it has been brought into its fastening position. As a result, the cylindrical spring region 8 of the wrap spring 11 deforms and enlarges its diameter until a non-interlocking frictional contact is produced with the inner wall 17 of the hollow cylinder 16. As a result, between the electric motor 4 and the belt reel 2, a non-interlocking contact fit is produced via which the torque is transmitted to the belt reel. This torque acts in the winding direction of the seat belt webbing so that a retensioning of the seat belt takes place. This retensioning of the seat belt can be produced not only in critical driving situations where there is a high probability of a crash, but also when power tightening is required in a crash.

If no crash occurs, but the retensioning has been triggered by the sensor system 22 due to a potential crash situation, the torque maintained by the electric motor 4 is reduced or switched off after a preselected time period. The spring element 6 (wrap spring 11) therefore returns to its starting position due to its restoring force. The non-interlocking contact fit between the cylindrical spring region 8 and the inner wall 17 of the hollow cylinder 16 is released in this process. The electric motor 4 can then be switched again into the mode for comfort control of the motive spring 3.

The damping device 29 can be designed in such a way that, via the wrap spring 11 which is still in clutch engagement, a restoring force is exerted on the belt reel 2 by which a blocking pawl, not shown in detail, and with which the belt reel is blocked on the frame 1, is brought out of blocking engagement.

If the belt reel 2 is blocked against rotation on the frame 1, in a crash, a reel part on which the belt webbing is wound can be rotated in a conventional manner with respect to the frame with interposition of a belt load limiter 18, for example a torsion bar. This rotating movement can be compensated for by the damping device 29 so that the gearing, preferably a worm arrangement (worm 27, worm wheel 33) of the electric motor 4 is protected against damage.

The damping device 29 is designed to store a restoring force in the loaded state. The loaded state occurs in the tightening operation during which the torque is transmitted from the electric motor 4 to the belt reel 2. The damping device 29, comprising for this purpose an elastically deformable torque-transmitting means, is brought, by the deformation of the torque-transmitting means, into a state in which it stores a restoring force. This is a result of the elastic deformation of the elastic damping elements transmitting the torque.

With the embodiment shown in FIGS. 1 and 2 the inertial force produced by an inertial mass 47 is utilised for initiating the deformation of the spring element 6 in order to bring the holding device 12 into its fastening position. In the embodiment shown, the inertial mass 47 is annular. The holding device 12 includes a pawl 46 mounted pivotally on the mounting part 13 in a pivot bearing 50. When the torque produced by the electric motor 4 is transmitted via the coupling member 14 and the wrap spring 10, still out of coupling engagement, to the bearing 13 for tightening the seat belt, the pawl 46 supported via a restoring spring on the inertial mass 47, rotates against the force of this restoring spring 51. The inertial mass 47 remains stationary with respect to this rotation due to its inertial mass. As a result, the pawl 46 is moved along a control element 45 provided on the inertial mass 47. Due to the course of a ramp-shaped control face 52 of the pawl, guided on the control element 45 in the form of a projection, the pawl 46 is moved in a substantially radial direction with its toothed system 24 into the toothed system 25 on the hollow cylinder 16 connected non-rotatably to the belt reel 2. As a result, non-interlocking and interlocking connections are produced between the belt reel 2 and the bearing 13. Due to the inertial mass of the belt reel and the restraining force emanating from the belt webbing, the bearing 13 is fastened against further rotation. As a result, the spring end 10 of the wrap spring 11 is also fastened. The other spring end 9, connected to the coupling member 14, is further rotated by the torque produced by the electric motor 4, so that the wrap spring 11 is enlarged in diameter and is pressed against the internal wall 17 of the hollow cylindrical part 15. As a result, a non-interlocking contact fit between the drive device and the belt reel is produced for transmitting the torque required for tightening the belt.

An electromagnetically actuated auxiliary holding device 53 can also be provided. This is triggered by the control device 19, in particular the control device 21 for the belt tightener. The auxiliary holding device has a brake block 54 which can be applied electromagnetically to the inertial mass 47 in braking contact, while the pawl 46 can be guided into engagement with the teeth 25. The brake block 54 can be actuated by an electromagnet provided in the auxiliary holding device 53.

Figure 3:
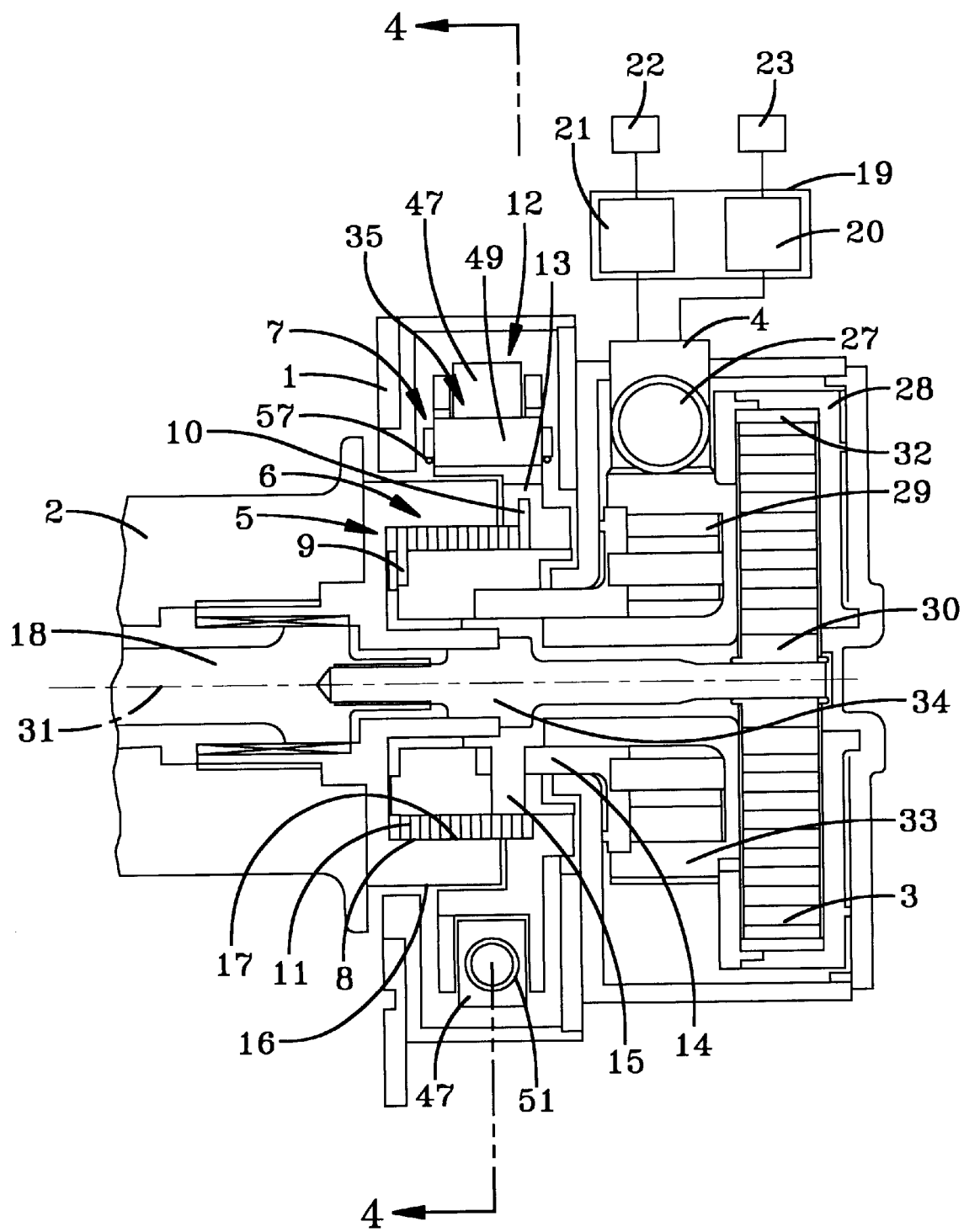
FIG. 3 is a fragmentary section through the spring side of a seat belt retractor according to a second embodiment of the invention.
Figure 4:
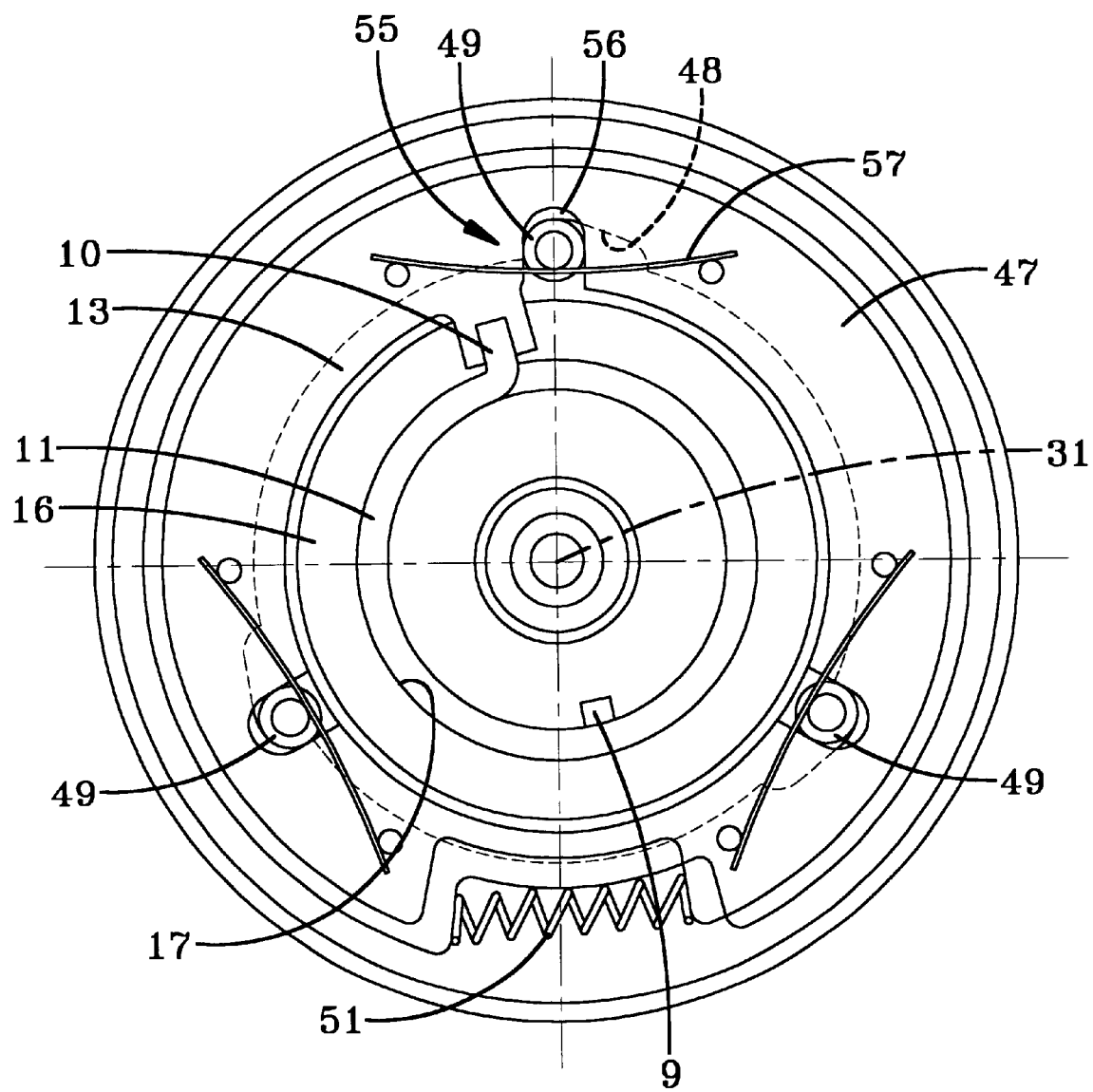
FIG. 4 is a sectional view of the embodiment in FIG. 3 along the section line 4—4.

In the embodiment shown in FIGS. 3 and 4, rolling elements 49 are arranged between the hollow cylinder 16 connected non-rotatably to the belt reel 2, and the annular inertial mass 47 in a guide device 55 provided on the annular bearing 13. The guide device has radially extending guide tracks 56 in which the rolling elements 49 are guided radially with respect to the belt reel axis 31. The rolling elements 49 are held in a resting position in the radially extending guide tracks 56 by associated holding springs 57 formed as leaf springs. This resting position is adopted by the rolling elements 49 during normal operation of the seat belt retractor.

The annular guide device 55 is connected non-rotatably to the bearing 13. When, as described above, a torque is transmitted from the electric motor 4 to the bearing, the torque acts on the guide device 55. As a result the latter is rotated together with the rolling elements 49 around the belt reel axis 31. The rolling elements now roll down oblique control faces 48 provided on the inside of the annular inertial mass 47. The rolling elements are now pressed radially onto the outside of the hollow cylinder 16 and fastened between the outside of the hollow cylinder and the control face 48 on the inertial mass 47. Due to the inertial mass 47 and the inert mass of the belt reel coupled via the hollow cylinder 16, the end of the spring 10 stays still during the further rotation of the coupling member 14 and the spring end 9 connected thereto, so that the diameter of the wrap spring 11 becomes enlarged, as already described. As a result, the outer circumference of the wrap spring 11 is pressed onto the inner wall 17 of the hollow cylinder 16, whereupon the wrap spring 11, acting as a clutch, is engaged for transmitting the torque. The torque produced by the electric motor 4 can be transmitted to the belt reel 2.

The return spring 51 that brings the individual components back into their starting positions, acts between the inertial mass 47 and the bearing 13 which can be formed together with the guide device 55 from one piece, when the torque communicated by the electric motor 4 is switched off. The engagement function of the clutch 5 brought about by the wrap spring 11 is then released. The rolling elements 49 are also brought back into their starting position by the restoring force of the associated leaf springs 47.

The invention is not confined to the particular construction and arrangement of parts herein illustrated and described, but embraces such modified forms thereof as come within the scope of the following claims.

I claim:

1. A seat belt retractor comprising a belt reel rotatably mounted on a frame, a motive spring that biases the belt reel in a winding direction, an electric motor adjusts the spring force of the motive spring and/or produces a torque for tightening a seat belt, and a clutch via which the torque can be transmitted to the belt reel, wherein the clutch comprises a spring element that can be deformed by the torque and which, when deformed, brings the clutch into an engaged state, wherein the spring element is fastened at one end of the spring by a holding device actuated by inertial force at least to initiate the deformation of the spring element, while the torque acts at the other end of the spring.

2. The seat belt retractor according to claim 1 wherein the holding device is connected to the belt reel by a releasable interlocking fit.

3. The seat belt retractor according to claim 1 wherein the holding device is connected to the belt reel by a frictional fit.

4. The seat belt retractor according to claim 1 wherein the holding device is mounted in a freely movable manner with respect to the belt reel during normal operation of the seat belt retractor and is moveable into a fastening position when there is torque-induced movement with respect to an inertial mass by a control element provided on the inertial mass.

5. Seat belt retractor according to claim 1 wherein the holding device is mounted rotatably with respect to the belt reel during normal operation of the seat belt retractor and is moveable into a fastening position when there is torque-induced movement with respect to an inertial mass by a control element provided on the inertial mass.

6. The seat belt retractor according to claim 1 wherein the holding device is pivotally mounted on an annular bearing mounted in a freely rotatable manner relative to the belt reel in normal operation, and the end of the spring to be fastened is connected to the bearing.

7. The seat belt retractor according to claim 2 wherein the interlocking fit comprises a pawl that engages with teeth non-rotatably connected to the belt reel.

8. The seat belt retractor according to claim 7 wherein the pawl is pivotally mounted against the force of a return spring in a pivot bearing on a bearing.

9. The seat belt retractor according to claim 8 wherein the return spring is supported on an inertial mass.

10. The seat belt retractor according to claim 3 wherein the releasable frictional fit in the holding device comprises at least one clamping element connected to a bearing, said clamping element being movable into a fastening position by a control face provided on an inertial mass.

11. The seat belt retractor according to claim 3 wherein the releasable frictional fit in the holding device comprises at least one rolling clamping element connected to a bearing, said rolling clamping element being movable into a fastening position by a control face provided on the inertial mass.

12. The seat belt retractor according to claim 4 wherein the inertial mass is freely movable relative to the belt reel during normal operation of the seat belt retractor.

13. The seat belt retractor according to claim 4 wherein the inertial mass is rotatable relative to the belt reel during normal operation of the seat belt retractor.

14. The seat belt retractor according to claim 4 wherein the inertial mass is annular.

15. The seat belt retractor according to claim 1 further comprising an auxiliary holding device is provided for fastening an inertial mass when the holding device is guided into the fastening position, said auxiliary holding device can be actuated electromagnetically and can be controlled by a control unit controlling the electric motor.

16. The seat belt retractor according to claim 1 wherein the holding device remains in its fastening position during the transmission of torque.

* * * * *